United States Patent [19]
Miller

[11] 4,206,865
[45] Jun. 10, 1980

[54] FORMED LOUVER FOR BURNER LINER

[75] Inventor: Guy W. Miller, Vernon, Conn.

[73] Assignee: United Technologies Corporation, Hartford, Conn.

[21] Appl. No.: 960,522

[22] Filed: Nov. 14, 1978

[51] Int. Cl.² .............................................. B21H 8/00
[52] U.S. Cl. .................... 228/152; 228/164; 228/170; 60/757
[58] Field of Search ............... 228/170, 173 B, 173 F, 228/184, 182, 171, 152, 144, 153, 154, 186, 145, 147, 141.1; 29/157 C, 156.4 WL, 157.4, 469.5; 113/116 UT, 120 N, 120 W; 219/60.2, 149, 153; 60/39.65

[56] References Cited

U.S. PATENT DOCUMENTS

| | | | |
|---|---|---|---|
| 653,903 | 7/1900 | Bray | 228/152 |
| 2,216,606 | 10/1940 | Taylor | 228/147 X |
| 2,785,878 | 3/1957 | Conrad | 228/170 X |
| 3,263,321 | 8/1966 | Lombardi | 72/49 X |
| 4,082,211 | 4/1978 | Embury | 228/145 |

Primary Examiner—Milton S. Mehr
Attorney, Agent, or Firm—Charles A. Warren

[57] ABSTRACT

Where the burner liner for gas turbine engines is made up of overlapping rings secured together, the ring is formed by rolling a strip to a selected shape and dimension crosswise of the strip so as to have appropriate thickness in the heavily stressed area, and less thickness where the stresses are lower, and then forming a selected length of the strip into a ring by bonding or welding together the ends of the selected length to make the desired ring dimension. This may be followed by shaping the ring into the desired conical shape to fit with adjacent rings to form the burner liner.

3 Claims, 5 Drawing Figures

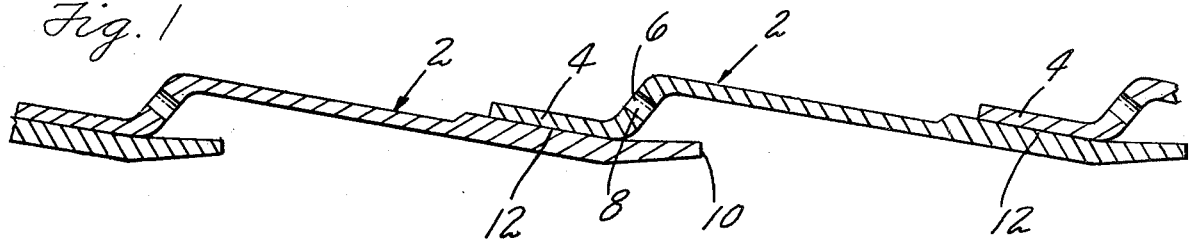
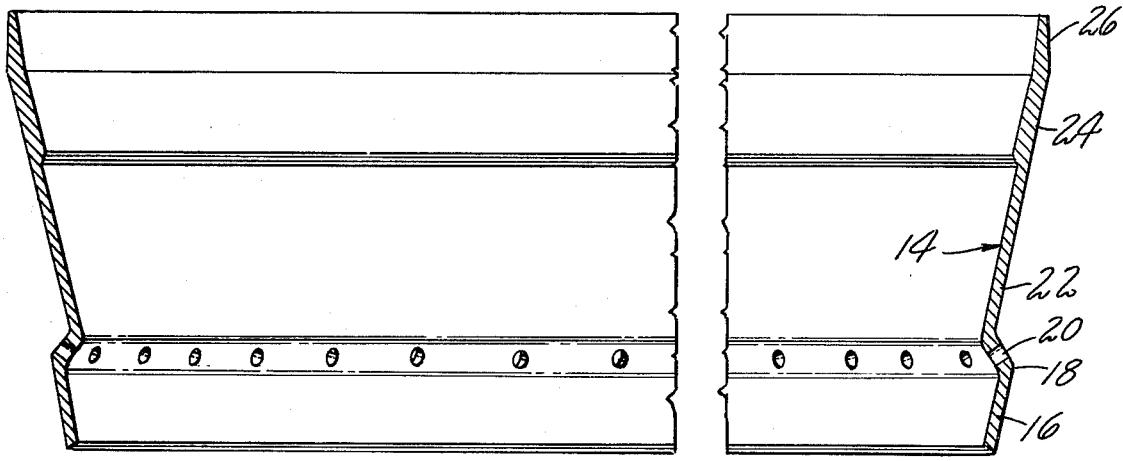
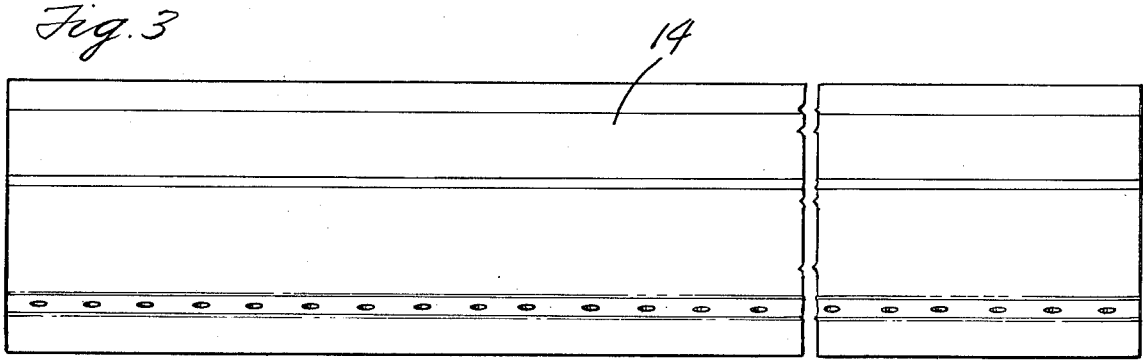
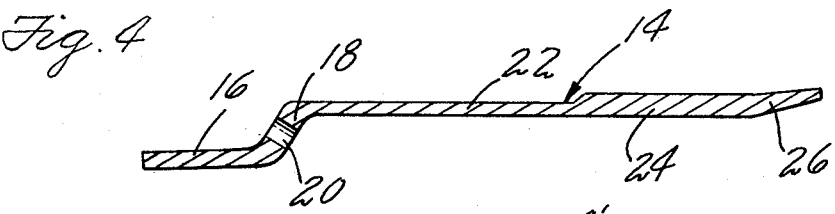
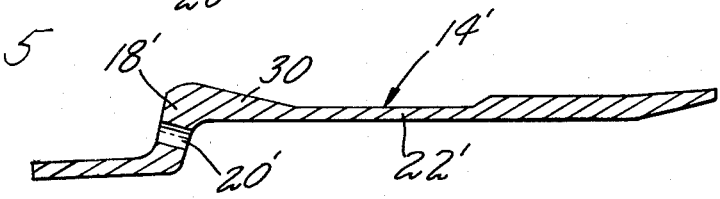

FORMED LOUVER FOR BURNER LINER

BACKGROUND OF THE INVENTION

The conventional louvered burner liner is made up of a plurality of rings with each ring cut from sheet metal. This sheet is perforated and shaped to have an offset between the edges for the cooling holes and attachment flanges at opposite edges. A number of these rings are then arranged in overlapping position and welded or bonded together in making the liner. An example of a liner of this type is shown in U.S. Pat. No. 3,872,664. These rings are subject to greater stresses in the areas of attachment to adjacent rings and in the areas of the cooling air holes, and in many cases at the unattached trailing edge of the ring located within the burner liner. To provide adequate strength in the critical areas the entire ring has been made thick enough to provide the necessary strength for the highest stressed areas, thereby making the remainder of the ring undesirably heavy and resulting in increased thermal stress. With such rings the completed burner liner is heavier than desirable and since the liner is cooled in part by the flow of cooling air over the outer surface this unnecessary thickness also interferes to some extent with the cooling process.

SUMMARY OF THE INVENTION

The present invention uses a formed strip of metal which varies in thickness in the crosswise direction so as to have a minimum of thickness where possible and a greater thickness at the more highly stressed areas of the ring such as the attachment areas, the perforated and contoured areas and in some cases the portion of the strip that becomes the trailing edge of the ring.

One feature of the invention is therefore a liner ring shaped from a strip, formed as by rolling with the strip varying in thickness from edge to edge, with the thickness greater in the highly stressed areas. The strip has its ends formed to form the ring. Another feature is the further forming of the strip in the same operation to the desired configuration of the ring where the ring, for example, has an offset between the edges in which the cooling holes may be located. The shaping of the strip as well as the variation of the thickness may all be accomplished in one forming operation with both thickness and shape being controlled for best performance of the ring.

According to the invention, the burner liner is made up of overlapping rings which are secured together in desired overlapping relation, with the individual rings being made up from strips of metal that have been rolled or otherwise formed to have a varying thickness from edge to edge with the thickness related to or proportioned to the stress concentrations in the rings of the burner. A section of this formed strip then has its ends bonded or welded together to make the ring, the length of strip having been selected to make the proper diameter of ring. If necessary, this ring may then be shaped to be somewhat frusto-conical so that adjacent rings may overlap to the desired extent. The several rings for the liner are then assembled and suitably bonded together for a complete liner wall.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a fragmentary sectional view through a burner liner showing the construction of the rings.

FIG. 2 is an enlarged sectional view through a completed ring.

FIG. 3 is a plan view of a strip used in making the ring.

FIG. 4 is a sectional view through the strip before it is cut to length to be made into the ring.

FIG. 5 is a sectional view similar to FIG. 4 of a modification.

DESCRIPTION OF THE PREFERRED EMBODIMENT

Referring first to FIG. 1, the burner liner is made up of a plurality of rings 2 having attachment to adjacent rings by an edge flange 4 at the upstream end. Adjacent the flange 4 the ring has an offset 6 in which there is a row of air holes 8. Downstream of the holes 8 the ring is essentially parallel to the flange 4. Adjacent the trailing edge 10 of the ring is an attachment surface 12 to which the flange 4 of the adjacent ring is secured. This surface is spaced from the trailing edge since the latter projects beyond this attachment to lie within and in spaced relation to the adjacent ring for guiding the flow of cooling air downstream of the holes 8.

In the present invention each ring is contoured to have a greater thickness where needed for stress purposes and a minimum thickness where permissible. To accomplish this the ring is made up of a strip 14, FIG. 3, having the required width for the ring and formed by rolling so as to have a thickened edge portion 16, FIG. 4, which becomes the attachment flange 4. Adjacent thereto is an offset portion 18, which for stress reasons is generally thicker than the edge 16. The offset portion has a row of holes 20 therethrough because of which the increased thickness is desirable. Adjacent thereto is the center portion 22 preferably the thinnest portion of the strip as this carries a minimum stress and with minimum thickness can more readily transfer heat from the inner surface, which is exposed to the heat of combustion in the burner to the outer surface that is cooled by cooling air flowing over it.

Beside this center portion is the attachment area 24 which, as shown in FIG. 1, is nearly as thick as the offset portion. This area is subjected to the thermal expansion stresses from the trailing edge portion 26 adjacent thereto, since this portion 26 has the greatest thermal changes of any part of the ring. These portions 24 and 26 are thicker than the attachment flange and when the rings are bonded together the combined thickness is the greatest at any point of the liner. The effect is to minimize heat distortion after a period of use since it is this area, particularly the trailing edge, that has been found to be most subject to serious distortion. For uniform cooling it is essential that the trailing edge portion of one ring remain as uniformly spaced from the adjacent ring as possible.

The varying thicknesses of the strip may be desirably formed as by a hot rolling operation in which a strip of adequate uniform thickness is fed between properly contoured rolls to work the material into the desired thicknesses. At the same time, if desired, the rolls may be shaped to produce the offset in which the holes are located. The holes would usually be made in the completed strip after it had been rolled to shape. Since the formation of the holes is not a part of the present invention it is not further described.

It will be understood that the location of these different thicknesses and the comparable thicknesses are given only by way of example and are the relative thicknesses found desirable in one form of ring for the particular reasons given above. Obviously other thicknesses could be desirable in particular burner structures. As shown, for example in FIG. 5, the strip 14' may have a greater thickness 30 directly downstream from the offset portion 18' and this thickness, greatest adjacent the row of holes 20', then tapers to the minimum thickness of the central web portion 22'. This arrangement will indicate the possibilities of thickness control as found necessary or desirable to prevent local failures of the ring when in operation.

The strip having been formed to a varying thickness transversely as shown, the strip is cut to lengths appropriate for forming a ring of the correct dimension. The opposite ends of each length of strip are joined together as by bonding or welding to form a complete ring of the desired diameter. One form of attachment for these ends may be transient liquid phase bonding known as TLP TM, although other bonding may be used.

The rings having been formed from a strip and the ends of the strip joined to form a completed ring, each ring is shaped to be slightly conical, as shown in FIG. 2, so that adjacent rings will telescope to form the desired contour for the liner. This shaping may be by any suitable stretching as by cold forming over a suitably shaped frusto-conical die. After the tapered shape is produced, the several rings making up the liner are assembled and bonded together with an inlet cap, not shown, for the liner to produce a complete liner or liner wall.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In the manufacture of a ring for a burner liner, the steps of:

rolling a strip of material the width of the ring to have a varying thickness crosswise of the strip to compensate for thermal stresses in the ring and an offset between the edges;

cutting the strip to lengths to form a ring; shaping each length into a ring and bonding the ends together to complete the ring; and forming the completed ring to a frusto-conical shape for assembly purposes.

2. The process of claim 1 in which the strip is thicker at one edge to form an attachment flange and at the other edge to form the trailing edge and attachment area to which the flange is secured.

3. The process of claim 2 in which the offset between the edges is thicker than the central portion of the strip adjacent thereto.

* * * * *